United States Patent [19]

Hundstad et al.

[11] 4,250,468

[45] Feb. 10, 1981

[54] TECHNIQUE FOR CW OR QUASI CW OPERATION OF PLANAR ELECTRODE LASER APPARATUS

[75] Inventors: Richard L. Hundstad, Forest Hills, Pa.; Owen Farish, Bearsden, Scotland

[73] Assignee: Westinghouse Electric Corp., Pittsburgh, Pa.

[21] Appl. No.: 3,847

[22] Filed: Jan. 16, 1979

[51] Int. Cl.³ .............................................. H01S 3/097
[52] U.S. Cl. ........................................... 331/94.5 PE
[58] Field of Search ................... 331/94.5 PE, 94.5 G

[56] References Cited

U.S. PATENT DOCUMENTS

| | | | |
|---|---|---|---|
| 3,781,712 | 12/1973 | Judd | 331/94.5 G |
| 3,842,366 | 10/1974 | Gordon et al. | 331/94.5 PE |
| 3,886,479 | 5/1975 | Pearson | 331/94.5 G |
| 4,077,018 | 2/1978 | Fahlen et al. | 331/94.5 PE |
| 4,080,578 | 3/1978 | Farish et al. | 331/94.5 PE |

*Primary Examiner*—James W. Davie
*Attorney, Agent, or Firm*—M. P. Lynch

[57] ABSTRACT

A glow discharge device positioned upstream in a flow laser gas system supplies a continuous flow of electrons to a laser discharge region defined between planar laser electrodes to develop sufficient background electron density to permit CW or quasi CW laser operation.

6 Claims, 4 Drawing Figures

TECHNIQUE FOR CW OR QUASI CW OPERATION OF PLANAR ELECTRODE LASER APPARATUS

BACKGROUND OF THE INVENTION

The prior art technique of employing arc discharge devices to produce electrons to initiate a laser discharge at the main electrodes of a laser system requires high power excitation of the arc discharge devices and results in significant heating, while acting non-uniformly on the volume of laser gas flow. While it is desirable to operate planar electrodes of a laser apparatus in a CW or quasi CW mode to achieve desired high power uniform laser discharge, such operation requires a high background electron density. While the arc devices are capable of generating sufficient background electron density to permit quasi CW operation of planar laser electrodes at low pressures, i.e., below 50 Torr, the arc discharge devices are not suitable for uniform discharge operation at pressures above 50 Torr and approaching several atmospheres.

The prior art technology of employing electrons supplied by an electron beam device (gun) to initiate and/or sustain a laser discharge a the main electrodes of a laser system requires the use of high voltages to accelerate electrons to high velocity so that they can penetrate a thin metallic foil and enter a laser optical cavity and, thereby, provide electrons for electron impact excitation. The foil is necessary to provide a seal which separates the very low pressure regions of an electron beam device from the considerably higher pressure regions of a laser excitation cavity. This type of laser has several disadvantages. The required foil is fragile and susceptible to failure by puncture by either arcs or by overheating at high energy loading. Electron beam devices also produce undesirable X-rays. Electron beam lasers also suffer from non-uniformity of optical gain in the laser cavity resulting from non-uniformity of electron density in the cavity. This has an adverse effect on beam divergence and control.

SUMMARY OF THE INVENTION

The DC excitation of a pin cathode electrode configuration of a glow discharge device located upstream in a flowing laser gas system develops a continuous glow current and provides a continuous flow of background electrons to a main laser discharge region defined by spaced-apart planar electrodes. The high background electron density provided by the continuous glow current of the glow discharge device permits CW or quasi CW laser operation in the main laser discharge region. The use of planar main electrodes, as compared to conventional main electrode configurations employing pin electrodes and associated UV or electron emitting elements, significantly enhances the opportunity for uniform excitation in the main laser discharge region.

The advantages realized in the CW or quasi CW operation of the main planar electrodes are the advantages of planar uniform field-type lasers, namely, uniform gain medium and its resulting improved optical homogeneity, higher electrical to optical conversion, and higher energy loading with a significantly less complex configuration and mode of operation as compared to a double pulse system.

While it is typically more difficult to control a self-maintained glow discharge where all of the electrons are produced by collisional ionization in the uniform field gap, a more stable system is obtained when large numbers of electrons are injected into the laser discharge region or cavity, with limited subsequent gas ionization. In cases where it is not possible for DC excitation, it is beneficial to provide a significant quantity of electrons over relatively long periods, with applied DC voltages of chosen magnitude such that the discharge will reach a maximum current value without arcing and will dissipate when the irradiation is removed. The technique of modulation of the intensity and/or duration of the external electron supply, with DC voltages applied to the main planar electrodes, provides long duration, low peak current discharges. The duration depends on how effectively the gas flow cools the discharge, but typically would be in the order of milliseconds. If complete removal of the electron source is required, the off-time would typically be in the order of an ion transit time, namely, approximately 10 microseconds.

BRIEF DESCRIPTION OF THE DRAWINGS

The invention will become more readily apparent from the following exemplary description in connection with the accompanying drawings.

DESCRIPTION OF THE PREFERRED EMBODIMENT

Figure 1:
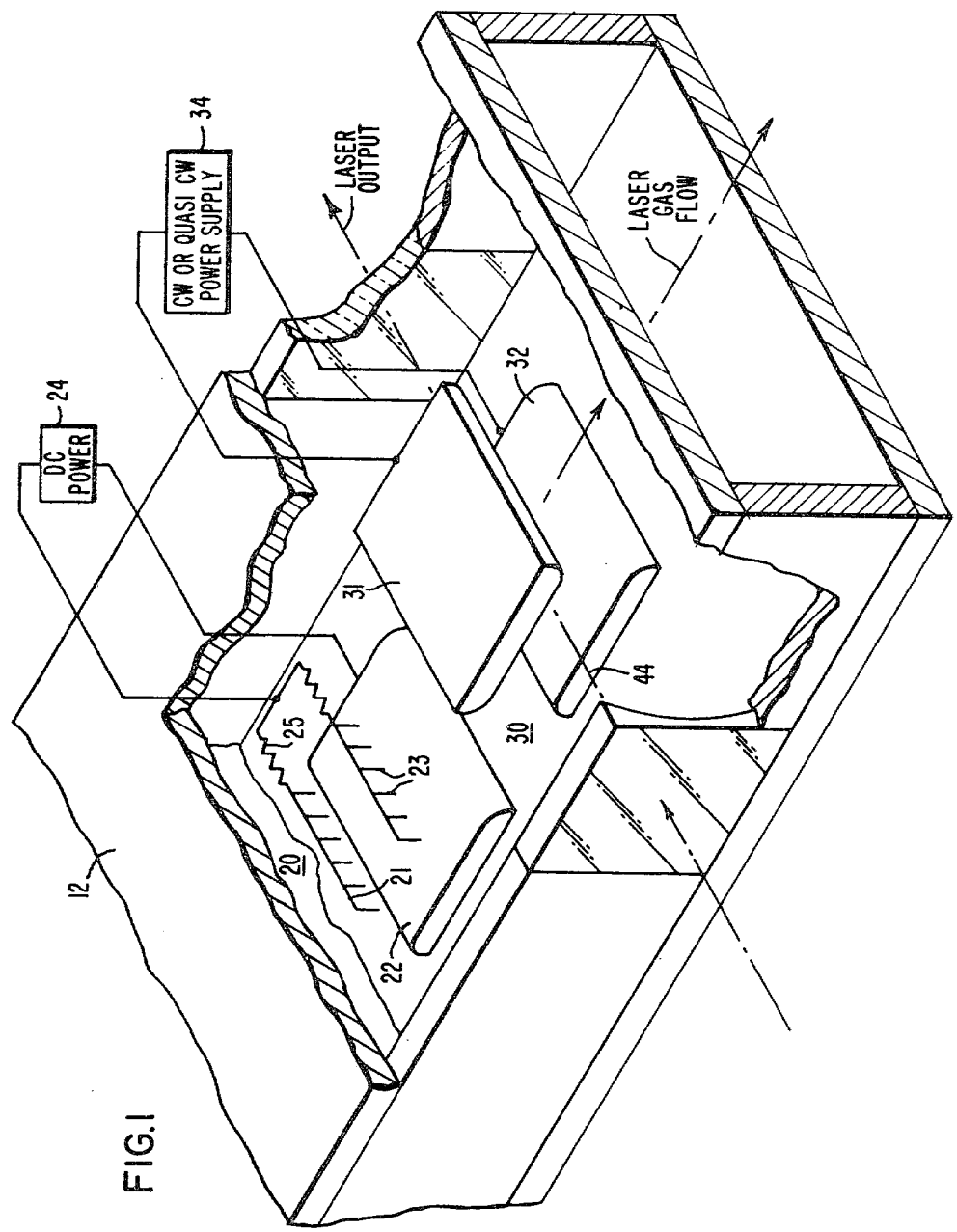
FIG. 1 is a sectioned perspective illustration of a laser apparatus employing the invention.

Referring to FIG. 1, the laser system 10 consists of a tubular laser housing 12 for supporting the flow of the laser gas from a pump 14 initially between the electrodes 21 and 22 of a glow discharge device 20 and subsequently between the main planar electrodes 31 and 32 of the laser apparatus 30. The spaced-apart main planar electrodes 31 and 32 define the laser discharge region 33 of the laser apparatus 30. Totally reflecting optical element 40 and partially transmitting optical element 42 are located relaive to the laser discharge region 33 to define an optical axis 44 and an optical resonant cavity through the discharge region. A laser output is transmitted through the optical element 42 in response to an appropriate population inversion within the discharge region 33.

Figure 2:
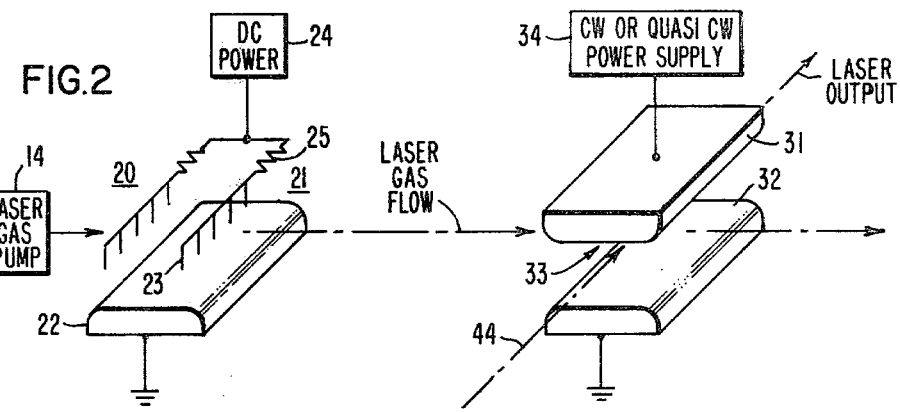
FIG. 2 is a schematic illustration of an implementation of the combination of a glow discharge device and the main laser electrode configuration defining the invention and employed in the laser system of FIG. 1.

The laser gas flow, as schematically illustrated in FIG. 2, is orthogonal to the optical axis 44. Actual laser gas supply means, cooling means and recirculating means for the laser gas are not shown inasmuch as they are well known in the art. The electrodes 21 and 22 of the glow discharge device 20 are connected to a DC power source 24 while the planar electrodes 31 and 32 of the laser apparatus 30 are connected to a separate CW or quasi CW DC power source 34. The electrode 21 of the glow discharge device 20 consists of rows of discrete cathode pin elements 23 electrically connected to the DC power source 24 via ballast resistors 25. Electrode 22 is a planar electrode which cooperates with the cathode pin elements 23 in response to electrical excitation by producing a glow discharge to introduce electrons in the laser gas flow which are subsequently transported to the main laser discharge region 33 to form the high background electron density required to support the CW or quasi CW excitation of the planar elecrodes 31 and 32. The CW or quasi CW DC excitation applied to the electrodes 31 and 32 by power source 34 produces a uniform electric field across the main laser discharge region 33 resulting in laser output via the optical element 42.

Suitable implementation of the glow discharge device 20 can be realized from the teachings of U.S. Pat. No. 4,080,578, entitled "Excitation Of High Pressure Gas Lasers" which is assigned to the assignee of the present invention and incorporated herein by reference. The implementation of the glow discharge arrangement described in the above-identified patent as the glow discharge device 20 of FIGS. 1, 2, and 3 will produce the glow discharge current and the continuous supply of electrons to the laser discharge region 33. The continuous supply of electrons to the main laser discharge region 33 produces the necessary high background electron density to support CW or quasi CW operation of the laser apparatus 30 at laser gas pressures between 50 Torr and several atmospheres.

Figure 3:
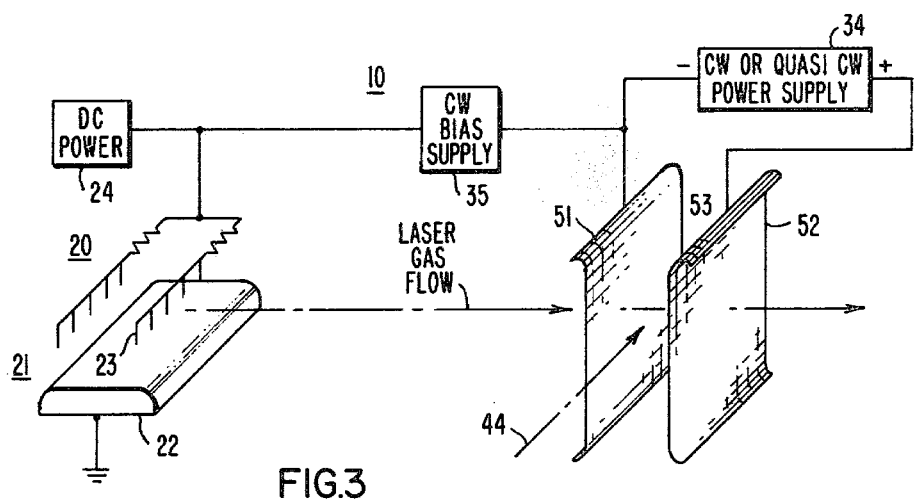
FIGS. 3 and 4 are schematic illustrations of alternate embodiments of the invention.
Figure 4:
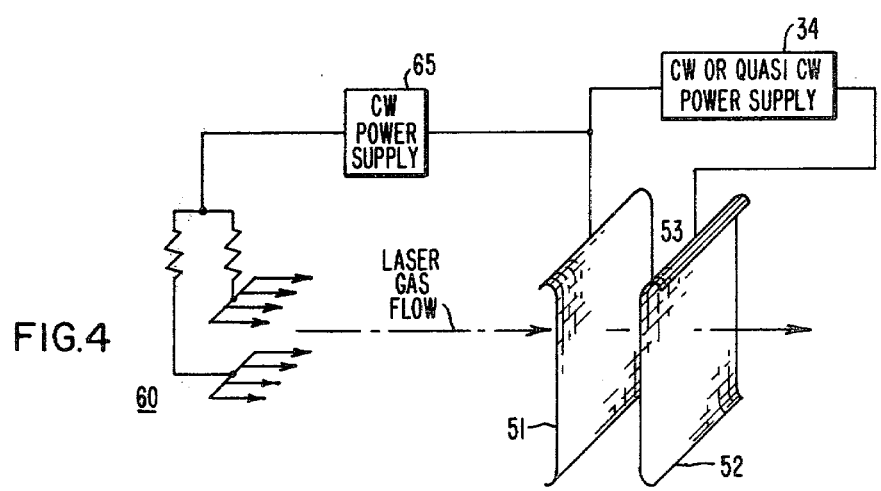

In the implementation of the glow discharge device 20 as a $CO_2$ laser, such as that disclosed in the above-referenced U.S. patent, having a laser gas medium consisting of $CO_2$, $N_2$ and He, the electrons produced by the glow discharge device are transported to the laser discharge region 33 of FIGS. 1 and 2 and 53 of FIGS. 3 and 4 by the long-lived metastable nitrogen.

While the embodiments illustrated in FIGS. 1 and 2 depict the transport of electrons from the glow discharge device 20 to the main laser discharge region 33 as being solely a function of the gas flow, electron transport to the main laser discharge region 33 can be enhanced by an electric field as illustrated in FIGS. 3 and 4. The main planar electrodes 51 and 52 of the laser apparatus 50 of FIG. 3 are mesh electrodes which extend perpendicular to the laser gas flow. Electrical excitation from the CW bias power supply 35 establishes an electric field which effectively enhances the movement of electrons from the glow discharge device 20 through the mesh electrodes 51 to the laser discharge region 53 defined between the spaced apart planar electrodes 51 and 52.

In the embodiment of FIG. 4 the glow discharge device of FIGS. 1-3 is replaced with a cathode pin array 60 which is electrically coupled with the main laser electrode 51 by a CW DC power supply 61. Electrode 51 functions in the dual capacity of an anode cooperating with the cathode pin array 60 to form a glow discharge arrangement 62 and in combination with main laser electrode 52 to form the main laser discharge region 53.

In the embodiments of FIGS. 3 and 4 the mesh electrode 51 functions in a manner similar to the grid of a thyratron tube. A large percentage of the electrons under the influence of the electric field produced by power supplies 35 and 65, respectively, are not collected in the mesh electrode 51 because of the limited mobility with respect to the laser gas flow, but instead are transported through the mesh electrode 51 into the discharge region 53. The use of mesh electrodes is described in U.S. Pat. No. 4,064,465, issued Dec. 20, 1977, entitled "Laser Cavities With Gas Flow Through The Electrodes", which is assigned to the assignee of the present invention and incorporated herein by reference.

We claim:

1. A laser apparatus comprising:
    a laser housing;
    a flowing laser gas medium at a pressure in excess of 50 Torr;
    spaced apart planar main laser electrodes defining a main laser discharge region therebetween;
    quasi CW electrical excitation means connected to said planar main laser electrodes;
    a glow discharge means located upstream from said main laser discharge region including spaced apart cathode and anode electrodes and a CW DC excitation means operatively connected to said spaced apart cathode and anode electrodes for producing a glow discharge current resulting in a continuous supply of electrons to said main laser discharge region via the flow of said laser gas medium; and
    optical reflective elements defining a resonant optical cavity within said main laser discharge region, said quasi CW electrical excitation means establishing an electric field within said main laser discharge region and responding to said continuous supply of electrons from said glow discharge means by exciting said laser gas medium to induce lasing action.

2. A laser apparatus as claimed in claim 1 wherein said glow discharge means includes:
    a cathode electrode consisting of an array of discrete cathode elements; and,
    a planar anode electrode spaced apart from said cathode electrode and defining a discharge region therebetween.

3. A laser apparatus as claimed in claim 1 further including a bias excitation means connected between said glow discharge means and said planar main laser electrodes to produce an electric field to enhance the transport of said electrons from said glow discharge means to said main laser discharge region.

4. A laser apparatus as claimed in claim 1 wherein said spaced apart planar main laser electrodes consist of first and second mesh electrodes oriented perpendicular to the flow of said laser gas, said laser gas flowing through said mesh electrodes.

5. A laser apparatus as claimed in claim 4 wherein the cathode electrode of said glow discharge means consists of an array of discrete cathode elements, and CW excitation means operatively connected between said cathode electrode of said glow discharge means and said first mesh electrode to produce said continuous supply of electrons, said first mesh electrode functioning in a dual capacity as an anode cooperating with the cathode electrode of said glow discharge means, and in cooperation with said second mesh electrode to define said main laser discharge region.

6. A laser apparatus comprising:
    a laser housing;
    a flowing laser gas medium at a pressure in excess of 50 Torr;
    spaced apart planar main laser electrodes defining a main laser discharge region therebetween;
    CW electrical excitation means connected to said planar main laser electrodes;
    a glow discharge means located upstream from said main laser discharge region including spaced apart cathode and anode electrodes and a CW DC excitation means operatively connected to said spaced apart cathode and anode electrodes for producing a glow discharge current resulting in a continuous supply of electrons to said main laser discharge region via the flow of said laser gas medium; and
    optical reflective elements defining a resonant optical cavity within said main laser discharge region, said CW electrical excitation means establishing an electric field within said main laser discharge region and responding to said continuous supply of electrons from said glow discharge means by exciting said laser gas medium to induce lasing action.

* * * * *